D. THOMPSON.
BEE-HIVE.
No. 192,605. Patented July 3, 1877.
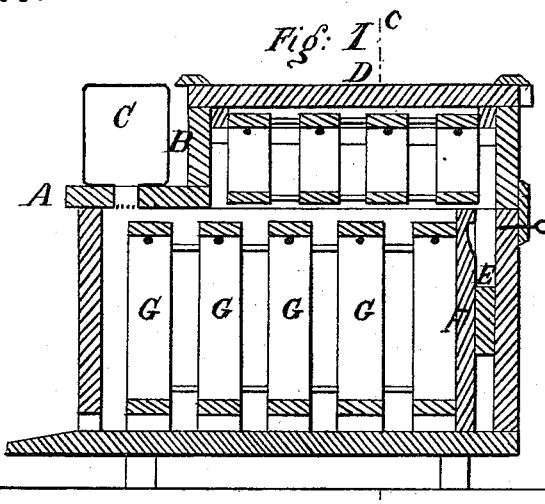
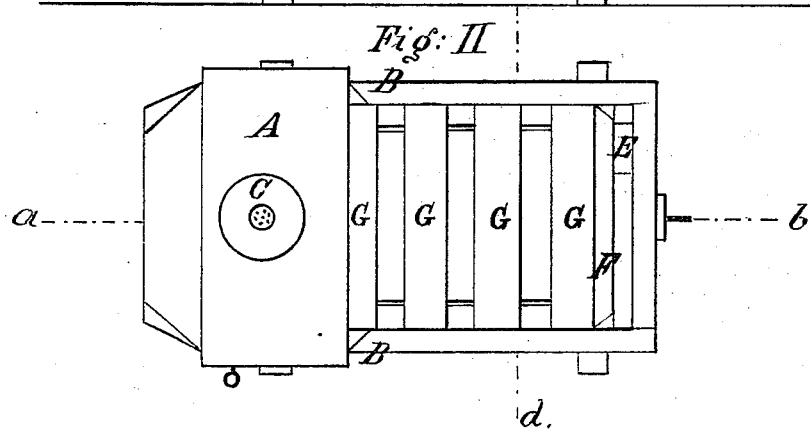
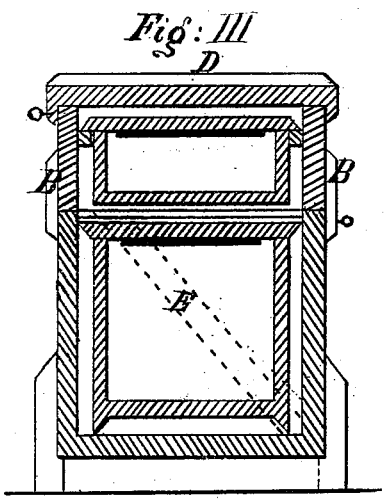
Witnesses:
James Pickel
Edward Trahne
Inventor:
David Thompson

UNITED STATES PATENT OFFICE.

DAVID THOMPSON, OF NASHVILLE, TENNESSEE.

IMPROVEMENT IN BEE-HIVES.

Specification forming part of Letters Patent No. 192,605, dated July 3, 1877; application filed April 28, 1877.

*To all whom it may concern:*

Be it known that I, DAVID THOMPSON, of Nashville, in the county of Davidson and State of Tennessee, have invented a certain new and useful Improvement in Bee-Hives; and do hereby declare that the following is a full, clear, and exact description thereof, reference being had to the accompanying drawings, and to the letters of reference marked thereon, making a part of this specification.

The nature of my invention consists in the construction and arrangement of a bee-hive which can be made without the use of glass, hinges, screws, and all other metals except nails, and used and opened without mashing or crushing the bees, the "top" and the surplus box being so arranged as to slide and to shove the bees out of the way. It can be adapted to small or large swarms, as desired.

I will now proceed to describe the construction and operation of my invention, referring to the annexed drawing, which represents a hive in use.

Figure I represents a vertical section of the hive, through *a b*, Fig. II. Fig. II represents a plan view. Fig. III represents an end view in section through *c d*, Figs. I and II.

Similar letters of reference indicate like parts.

Letter A represents a "feeding-board," which slides against B, and is immediately over the brood. It has a hole, through which the bees are fed by the use of my vacuum-feeder C, and enables the operator to know the condition of his bees, and to see if they are building surplus honey in surplus frames inside of B. A slides against B in such a manner as to prevent the mashing of bees, proper spaces being retained. A, with the top D, forms the cover of a one-story hive, the cleat on the top of D breaking the joint and keeping out the water. The surplus box B can be put away until the honey season.

B is a surplus-box, which enables the operator to reduce the surplus frames to shallow frames, so as to prevent "brood" from being made in the surplus department. It does away with the honey-board, and allows the heat from the brood-chamber to rise. When B slides against A it will not mash bees, B being so constructed as to allow A to pass under a distance to the extent of the thickness of the front of B, the sides of B, at their connection with A, being so cut away as to prevent the mashing of bees, as shown in the drawing.

B can be reversed with the feeding-board A, from front to rear, so as to have the comb made in the warmest part of the hive in the surplus frames or boxes.

A cleat is nailed on the back of box B, and answers for a stop. The cleats on the sides are guides.

C represents the feeder. It has a tube. On the tube slips a cap, and to one end of said cap is soldered a piece of perforated tin. The cap can be pulled off and the feeder C filled with sirup or water, and the cap put on again. Turn C upside down and it will form a vacuum, and the contents will not run out. Place C on the feeding-board A, the tube being in the hole, and the bees can take its contents out as fast as they wish.

D represents the top of the hive, and, with A, forms the cover of a one-story hive, as before shown.

E represents a key or wedge, which slips down from corner to corner between the division-board F and the back of the hive, and adjusts the frames.

When E is pulled out it answers as a lever to raise the division-board F, in case the latter becomes glued or tight, F being provided with a hole cut in the back to receive the lever E.

F is a division-board, with a hole in it. G are the frames, which set in the hive on feet, the sides of the frames forming the feet. No rabbets are loosened. The frames are provided with a wax cord, fastened on the bottom of the top bar of the frames, thus doing away with the bevel strip.

What I claim as new, and desire to secure by Letters Patent, is—

The combination, with the hive proper, of the supplemental hive or box B, feed-board A, feed-cup C, and key and lever E, all arranged substantially as described and shown.

This the 24th day of April, A. D. 1877.

DAVID THOMPSON.

Witnesses:
JAMES PICKEEL,
EDWARD TRABUE.